United States Patent
Sung et al.

(10) Patent No.: US 11,012,842 B2
(45) Date of Patent: *May 18, 2021

(54) WIRELESS STEREO BLUETOOTH COMMUNICATION MECHANISM CAPABLE OF EFFECTIVELY REDUCING NUMBER OF AUDIO PACKET RETRANSMISSION

(71) Applicant: Audiowise Technology Inc., Hsinchu County (TW)

(72) Inventors: Chih-Wei Sung, Hsinchu County (TW); Jing-Syuan Jia, Hsinchu County (TW); I-Ken Ho, Hsinchu County (TW); Pete Hsinhsiang Liu, Sunnyvale, CA (US); Kuang-Hu Huang, Hsinchu County (TW)

(73) Assignee: Audiowise Technology Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,798

(22) Filed: Dec. 24, 2019

(65) Prior Publication Data

US 2020/0137544 A1 Apr. 30, 2020

Related U.S. Application Data

(63) Continuation-in-part of application No. 16/034,370, filed on Jul. 13, 2018, now Pat. No. 10,555,156.
(Continued)

(51) Int. Cl.
*H04W 4/80* (2018.01)
*G06F 3/16* (2006.01)
(Continued)

(52) U.S. Cl.
CPC .............. *H04W 4/80* (2018.02); *G06F 3/162* (2013.01); *H04L 1/08* (2013.01); *H04L 1/16* (2013.01);
(Continued)

(58) Field of Classification Search
CPC .... H04W 4/80; H04W 72/0446; H04R 5/033; H04R 3/00; H04R 3/12; H04L 1/16
See application file for complete search history.

(56) References Cited

U.S. PATENT DOCUMENTS 8,010,047 B2 * 8/2011 Terashima ............... H04B 1/40
455/41.2
9,712,186 B1 * 7/2017 Schulz .................. H04L 1/1829
(Continued)

FOREIGN PATENT DOCUMENTS

CN 105765613 A 7/2016
CN 108260056 A 7/2018
(Continued)

*Primary Examiner* — Devan A Sandiford
(74) *Attorney, Agent, or Firm* — Winston Hsu

(57) ABSTRACT

A method applied into a controller of a Bluetooth device includes: providing a first flag and a second flag which are configured as a default value respectively; changing the first flag from the default value when the controller successfully receives the particular packet transmitted from the audio gateway; changing the second flag from the default value when the controller successfully receives an acknowledgement from a secondary device wherein a reception of the acknowledgement indicates that the secondary device successfully receives the particular packet; and transmitting an acknowledgement of a particular packet to an audio gateway when detecting that either the first flag or the second flag changes and becomes different from the default value.

14 Claims, 5 Drawing Sheets

Related U.S. Application Data which is a continuation-in-part of application No. 15/808,853, filed on Nov. 9, 2017, now Pat. No. 10,212,569.

(51) Int. Cl.
  *H04W 72/04*   (2009.01)
  *H04R 3/00*    (2006.01)
  *H04L 1/16*    (2006.01)
  *H04L 1/08*    (2006.01)
  *H04R 5/033*   (2006.01)

(52) U.S. Cl.
  CPC .............. *H04L 1/1657* (2013.01); *H04R 3/00* (2013.01); *H04R 5/033* (2013.01); *H04W 72/0446* (2013.01)

(56) References Cited

U.S. PATENT DOCUMENTS

| | | | |
|---|---|---|---|
| 10,009,862 B1* | 6/2018 | Malovany | H04R 3/12 |
| 10,104,474 B2 | 10/2018 | Watson | |
| 10,200,791 B1* | 2/2019 | Liu | H04W 4/80 |
| 10,206,039 B1* | 2/2019 | Yun | G06F 3/165 |
| 10,212,569 B1* | 2/2019 | Huang | H04W 88/16 |
| 10,244,307 B1* | 3/2019 | Tong | H04L 1/16 |
| 10,341,758 B1* | 7/2019 | Tong | H04R 1/1016 |
| 2005/0270565 A1* | 12/2005 | Shima | H04N 1/00915 358/1.15 |
| 2006/0194538 A1* | 8/2006 | Palin | H04M 1/733 455/41.2 |
| 2006/0194600 A1* | 8/2006 | Palin | H04W 16/14 455/512 |
| 2006/0205401 A1* | 9/2006 | Palin | H04M 1/6066 455/425 |
| 2007/0036247 A1* | 2/2007 | Capretta | H04L 27/22 375/343 |
| 2010/0232618 A1* | 9/2010 | Haartsen | H04L 1/0003 381/80 |
| 2011/0059696 A1 | 3/2011 | Rasmussen | |
| 2012/0058727 A1* | 3/2012 | Cook | H04R 3/00 455/41.3 |
| 2014/0137199 A1* | 5/2014 | Hefetz | G06F 21/73 726/3 |
| 2015/0149737 A1* | 5/2015 | Hobson | G06F 9/52 711/152 |
| 2015/0271103 A1* | 9/2015 | Thayalan | H04L 49/25 370/217 |
| 2015/0319557 A1* | 11/2015 | El-Hoiydi | H04W 4/60 455/41.2 |
| 2015/0348007 A1* | 12/2015 | Khan | G06Q 20/4018 705/44 |
| 2015/0350814 A1* | 12/2015 | Krochmal | G06F 9/542 455/41.2 |
| 2015/0351143 A1* | 12/2015 | Seymour | H04R 25/554 455/41.2 |
| 2017/0134227 A1* | 5/2017 | Song | H04L 1/1887 |
| 2017/0251469 A1* | 8/2017 | Lee | H04L 1/16 |
| 2018/0020476 A1* | 1/2018 | Aijaz | H04L 69/28 |
| 2018/0084456 A1* | 3/2018 | Gostev | H04W 84/18 |
| 2018/0084606 A1* | 3/2018 | Li | H04W 72/085 |
| 2018/0091965 A1* | 3/2018 | Watson | H04W 4/08 |
| 2018/0184234 A1* | 6/2018 | Chen | H04W 76/14 |
| 2018/0317126 A1* | 11/2018 | Wang | H04W 4/80 |
| 2018/0352558 A1* | 12/2018 | Paycher | H04W 72/1215 |
| 2019/0098675 A1* | 3/2019 | Paycher | H04W 76/14 |
| 2019/0104424 A1* | 4/2019 | Hariharan | H04R 3/12 |
| 2019/0141502 A1* | 5/2019 | Sung | H04W 4/80 |
| 2019/0230459 A1* | 7/2019 | Sridharan | H04R 5/033 |
| 2019/0230738 A1* | 7/2019 | Desai | H04L 1/189 |
| 2019/0274024 A1* | 9/2019 | Sung | H04W 4/80 |
| 2020/0022198 A1* | 1/2020 | James | H04R 1/1091 |
| 2020/0252993 A1* | 8/2020 | Srivastava | H04W 4/80 |
| 2020/0322092 A1* | 10/2020 | Goyal | H04L 1/0072 |
| 2020/0336958 A1* | 10/2020 | Sridhara | H04W 36/02 |
| 2020/0359134 A1* | 11/2020 | Tong | H04L 1/1664 |
| 2020/0382880 A1* | 12/2020 | Krogsgaard | H04R 25/554 |

FOREIGN PATENT DOCUMENTS

| | | |
|---|---|---|
| KR | 10-2009-0003649 A | 1/2009 |
| WO | 2016/003064 A1 | 1/2016 |

\* cited by examiner

WIRELESS STEREO BLUETOOTH COMMUNICATION MECHANISM CAPABLE OF EFFECTIVELY REDUCING NUMBER OF AUDIO PACKET RETRANSMISSION

CROSS REFERENCE TO RELATED APPLICATIONS

This application is a continuation in part application of U.S. Non-provisional application Ser. No. 16/034,370, filed on Jul. 13, 2018, which is a continuation in part of U.S. Non-provisional application Ser. No. 15/808,853, filed on Nov. 9, 2017, which is entirely incorporated herein by reference.

BACKGROUND OF THE INVENTION

1. Field of the Invention

The invention relates to a Bluetooth audio communication mechanism, and more particularly to a controller of a wireless stereo Bluetooth device, corresponding method, and such Bluetooth device.

2. Description of the Prior Art

Generally speaking, for a conventional Bluetooth communication, there is a great probability that a primary/master device successfully receives and decodes a Bluetooth packet but a secondary/slave device fails in a first time slot while the secondary/slave device successfully receives and decodes the retransmitted Bluetooth packet but the primary/master device fails in a second time slot later than the first time slot. This causes the larger number of Bluetooth packet retransmission. The retransmission probability becomes higher especially when the primary device (or secondary deice) is farther away from an audio gateway in a strong interfering environment and/or the wireless communication signal between the primary and secondary devices is partly blocked by an object such as a user's head when the primary and secondary devices are earphones or headsets.

SUMMARY OF THE INVENTION

Therefore one of the objectives of the invention is to provide a novel Bluetooth audio communication mechanism, to solve the above-mentioned problems.

According to the embodiments, a controller of a Bluetooth device comprises a memory and a processor. The memory is configured for storing a first flag and a second flag. The processor is coupled to the memory, and is configured for transmitting an acknowledgement of a particular packet to an audio gateway when detecting that either the first flag or the second flag changes and becomes different from a default value. The first flag is changed by the processor and becomes different from the default value when the processor successfully receives the particular packet transmitted from the audio gateway, and the second flag is changed by the processor and becomes different from the default value when the processor successfully receives an acknowledgement from a secondary device wherein a reception of the acknowledgement indicates that the secondary device successfully receives the particular packet.

According to the embodiments, a method applied into a controller of a Bluetooth device is disclosed. The method comprises: providing a first flag and a second flag which are configured as a default value respectively; changing the first flag from the default value when the controller successfully receives the particular packet transmitted from the audio gateway; changing the second flag from the default value when the controller successfully receives an acknowledgement from a secondary device wherein a reception of the acknowledgement indicates that the secondary device successfully receives the particular packet; and transmitting an acknowledgement of a particular packet to an audio gateway when detecting that either the first flag or the second flag changes and becomes different from the default value.

According to the embodiments, a controller of a Bluetooth device comprises a memory and a processor. The memory is configured for storing a first flag and a second flag. The first flag is changed by a processor and becomes different from a default value when the processor successfully receives a particular packet transmitted from an audio gateway, and the second flag is changed by the processor and becomes different from the default value when the processor successfully receives an acknowledgement from a secondary device wherein a reception of the acknowledgement indicates that the secondary device successfully receives the particular packet. The processor is coupled to the memory, and is configured for: increasing a first counter of the first flag by one each time when successfully receives the particular packet transmitted from the audio gateway; increasing a second counter of the second flag by one each time when the processor successfully receives the acknowledgement from the secondary device; and sending a negative acknowledgement of the particular packet to the audio gateway when a difference between the first counter and the second counter is larger than or equal to a counter difference threshold.

According to the embodiments, a method applied into a controller of a Bluetooth device is disclosed. The method comprises: providing a first flag and a second flag which are configured as a default value respectively; changing the first flag from the default value when the controller successfully receives the particular packet transmitted from the audio gateway; and changing the second flag from the default value when the controller successfully receives an acknowledgement from a secondary device wherein a reception of the acknowledgement indicates that the secondary device successfully receives the particular packet. The step of changing the first flag comprises: increasing a first counter of the first flag by one each time when successfully receives the particular packet transmitted from the audio gateway. The step of changing the second flag comprises: increasing a second counter of the second flag by one each time when the processor successfully receives the acknowledgement from the secondary device. The method further comprises: sending a negative acknowledgement of the particular packet to the audio gateway when a difference between the first counter and the second counter is larger than or equal to a counter difference threshold.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a solution capable of reducing the number of audio packet retransmission in a wireless communication so as to improve system performance as far as possible. More particularly, the provided solution can be arranged to solve the problems of Bluetooth devices in a wireless Bluetooth audio communication system.

Figure 1:
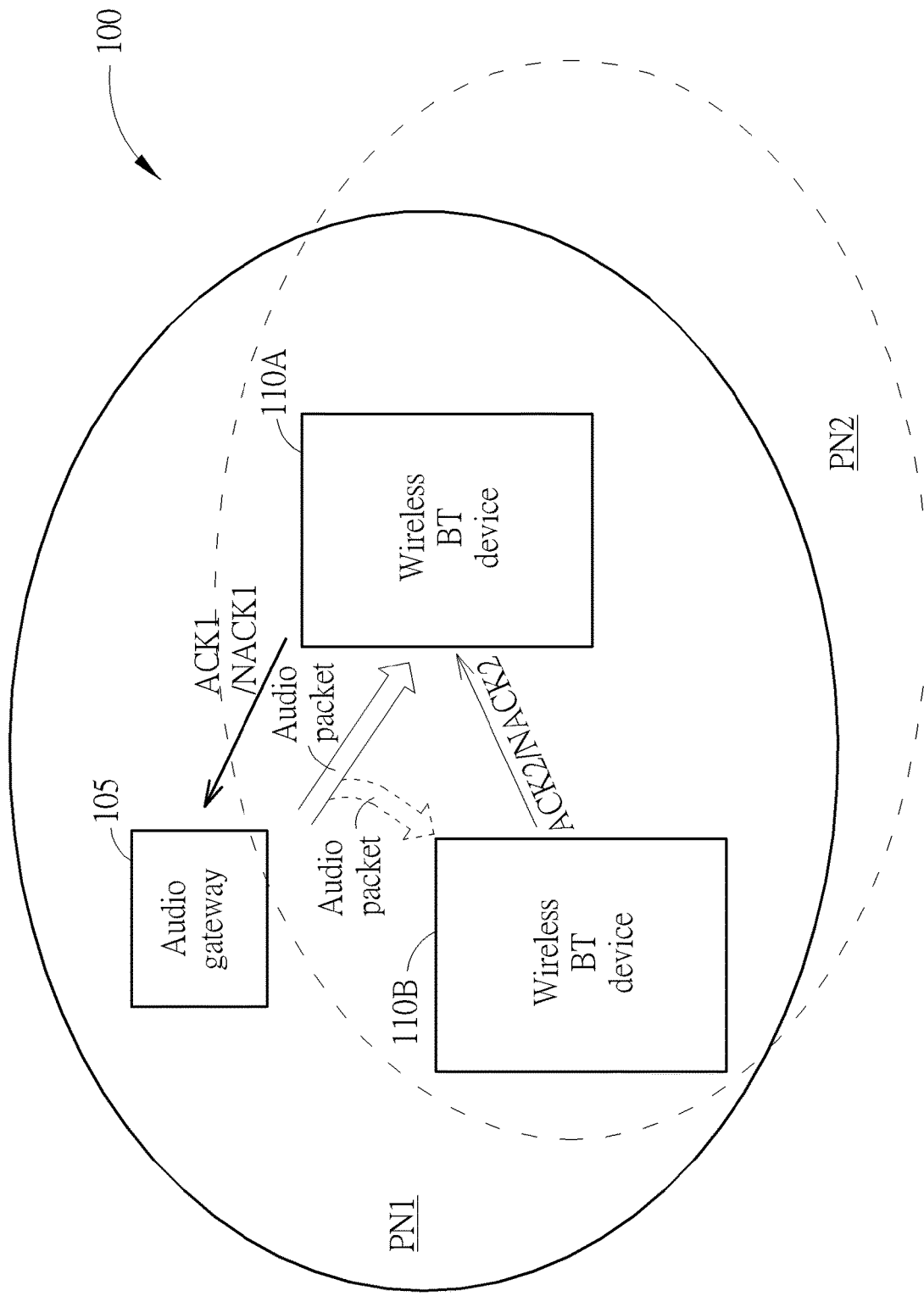
FIG. 1 is a block diagram of a wireless Bluetooth audio communication system according to embodiments of the invention.

Refer to FIG. 1. FIG. 1 is a block diagram of a wireless Bluetooth audio communication system 100 according to embodiments of the invention. The communication system 100 comprises an audio gateway 105 and for example two wireless Bluetooth devices 110A and 110B. The audio gateway 105 for example is a mobile phone device or smart phone device (but not limited). Bluetooth devices 110A and 110B are for example Bluetooth headsets, headphones, or wireless speakers (but not limited) which can receive wireless Bluetooth packet(s) of audio stream. For instance, the Bluetooth devices 110A and 110B may be two earphone devices for a user, and the audio gateway 105 may be the user's mobile phone device which transmits wireless packets to the devices 110A and 110B. For Bluetooth communication, one of the devices 110A and 110B is used as a primary device and the other is used as a secondary device. The devices 110A and 110B can negotiate with each other to determine which one is the primary device and which one is the secondary device.

A piconet for example is defined as an ad hoc network that links a wireless user group of devices using Bluetooth technology protocols. The audio gateway 105 and a primary device can communicate with each other directly in the first piconet PN1, and a secondary device does not communicate with audio gateway 105 directly in the first piconet PN1. For example, the primary device can send an acknowledgement signal back to the audio gateway 105 to notify the audio gateway 105 of successfully receiving and decoding an audio packet sent from audio gateway 105. A secondary device does not notify the audio gateway 105 by directly sending an acknowledgement signal to audio gateway 105.

In the embodiments, the audio gateway 105 is arranged to communicate with the primary device in the first piconet PN1 and to transmit packet(s) of audio stream to the primary device and the secondary device. For instance, the Bluetooth device 110A is used as a primary device, and the Bluetooth device 110B is used as a corresponding secondary device. Further, after the second piconet PN2 is established, no matter which one is used as the primary device, the Bluetooth devices 110A and 110B can be arranged to exchange and/or share control information and data. The Bluetooth device 110B as a secondary is arranged to sniff the audio packet (s) from audio gateway 105 and to send acknowledgement ACK2 or negative acknowledgement NACK2 to the Bluetooth device 110A based on the sniff result. The Bluetooth device 110A is arranged to send the acknowledgement ACK1 or negative acknowledgement NACK1 to the audio gateway 105 based on the reception result of audio packet and the sniff result of Bluetooth device 110B; the operations will be clearly described in later.

Figure 2:
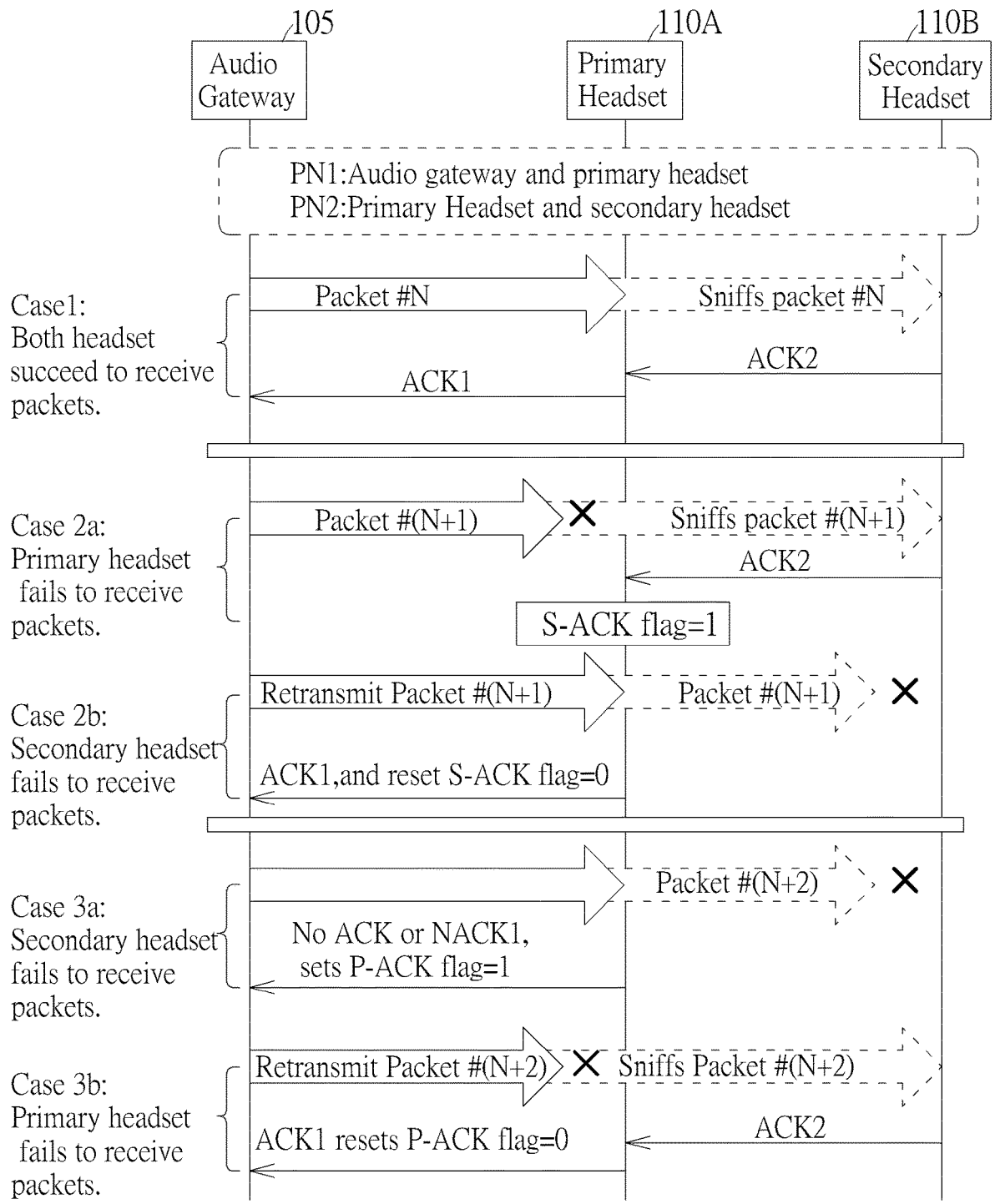
FIG. 2 is a timing diagram illustrating an example of the audio gateway, the Bluetooth device used as a primary headset, and the Bluetooth device used as a secondary headset according to the embodiments of FIG. 1.

Please refer to FIG. 2. FIG. 2 is a timing diagram illustrating an example of the audio gateway 105, the Bluetooth device 110A used as a primary headset, and the Bluetooth device 110B used as a secondary headset according to the embodiments of FIG. 1. In the first case of FIG. 2, the audio gateway 105 transmits the N-th packet indicated by #N to the primary headset 110A, and the secondary headset 110B sniffs the N-th packet #N. In this case, both the primary headset 110A and secondary headset 110B successfully receive and decode the N-th packet #N. The secondary headset 110B transmits an acknowledgement (ACK) to the primary headset 110A, and after receiving the acknowledgement ACK the primary headset 110A transmits another acknowledgement back to the audio gateway 105. When receiving the acknowledgement of the primary headset 110A, the audio gateway 105 can know that the N-th packet #N has been successfully received and decoded by both the headsets and may transmit a next packet.

In the second case 2a with 2b of FIG. 2, the audio gateway 105 transmits the (N+1)-th packet indicated by #(N+1) to the primary headset 110A, and the secondary headset 110B sniffs the (N+1)-th packet #(N+1). In this case, the secondary headset 110B successfully sniffs to received and then decodes the (N+1)-th packet #(N+1), and the primary headset 110A fails to receive and decode the (N+1)-th packet #(N+1). The secondary headset 110B is arranged to send an acknowledgement ACK to the primary headset 110A, and the primary headset 110A is arranged to assert the flag S-ACK after receiving the acknowledgement ACK of secondary headset 110B. For example, the flag S-ACK can be implemented by using a bit which is configured as '1' when the acknowledgement ACK of secondary headset 110B is received. Later, in a different timing, the audio gateway 105 retransmits the (N+1)-th packet to the primary headset 110A, and the secondary headset 110B sniffs the (N+1)-th packet #(N+1). In this case, the secondary headset 110B fails to sniff the retransmitted (N+1)-th packet #(N+1), and the primary headset 110A successfully receives and decodes the retransmitted (N+1)-th packet #(N+1). Even though the secondary headset 110B does not send an acknowledgement ACK to the primary headset 110A, the primary headset 110A can know that the content of (N+1)-th packet #(N+1) has been received and decoded by the secondary headset 110B based on the assertion of flag S-ACK. The primary headset 110A transmits an acknowledgement ACK to the audio gateway 105 and then resets or de-asserts the flag S-ACK as '0'. When receiving the acknowledgement of the primary headset 110A, the audio gateway 105 can know that the content of (N+1)-th packet #(N+1) whether originally transmitted or retransmitted has been successfully received and decoded by both the headsets and may transmit a next packet.

Further, In the third case 3a with 3b of FIG. 2, the audio gateway 105 transmits the (N+2)-th packet indicated by #(N+2) to the primary headset 110A, and the secondary headset 110B sniffs the (N+2)-th packet #(N+2). In this case, the secondary headset 110B fails to sniff the (N+2)-th packet #(N+2), and the primary headset 110A successfully receives and decodes the (N+2)-th packet #(N+2). The secondary headset 110B does not send an acknowledgement ACK to the primary headset 110A. The primary headset 110A is arranged to assert the flag P-ACK after successfully receiving and decoding the (N+2)-th packet #(N+2). Since the primary headset 110A does not receive the acknowledgement ACK of the secondary headset 110B, the primary headset 110A may be arranged to not transmit an acknowledgement ACK to the audio gateway 105 or may be arranged to transmit a negative acknowledgement NACK to the audio gateway 105. Later, in a different timing, the audio gateway 105 retransmits the (N+2)-th packet #(N+2) to the primary headset 110A, and the secondary headset 110B sniffs the retransmitted (N+2)-th packet #(N+2). In this case, the secondary headset 110B successfully sniffs the retransmitted (N+2)-th packet #(N+2), and the primary headset 110A fails to receive and decode the retransmitted (N+2)-th packet #(N+2). Even though the primary headset 110A fails to receive and decode the retransmitted (N+2)-th packet #(N+2), the primary headset 110A can know that the content of (N+2)-th packet #(N+2) has been received and decoded by the primary headset 110A in a previous timing based on the assertion of flag P-ACK. Then, when receiving the acknowledgement ACK of the secondary headset 110B, the primary headset 110A transmits another different acknowledgement ACK to the audio gateway 105 and then resets or de-asserts the flag P-ACK as '0'. When receiving the acknowledgement of the primary headset 110A, the audio gateway 105 can know that the content of (N+2)-th packet #(N+2) whether originally transmitted or retransmitted has been successfully received and decoded by both the headsets and may transmit a next packet.

Further, it is to be noted that the same audio packet may be retransmitted more times (e.g. twice or three times) if both the primary and secondary devices fail to receive such audio packet in one time slot. The number of retransmission of the same audio packet is not meant to be a limitation. The retransmission of the same audio packet may be arranged to not repeat until both the primary and secondary devices successfully receive and decode such audio packet or until the Bluetooth communication is disconnected.

By doing so, the number of retransmission of an audio packet can be reduced. The audio gateway 105 can efficiently transmit audio packet(s) to both the Bluetooth devices 110A and 110B.

Figure 3:
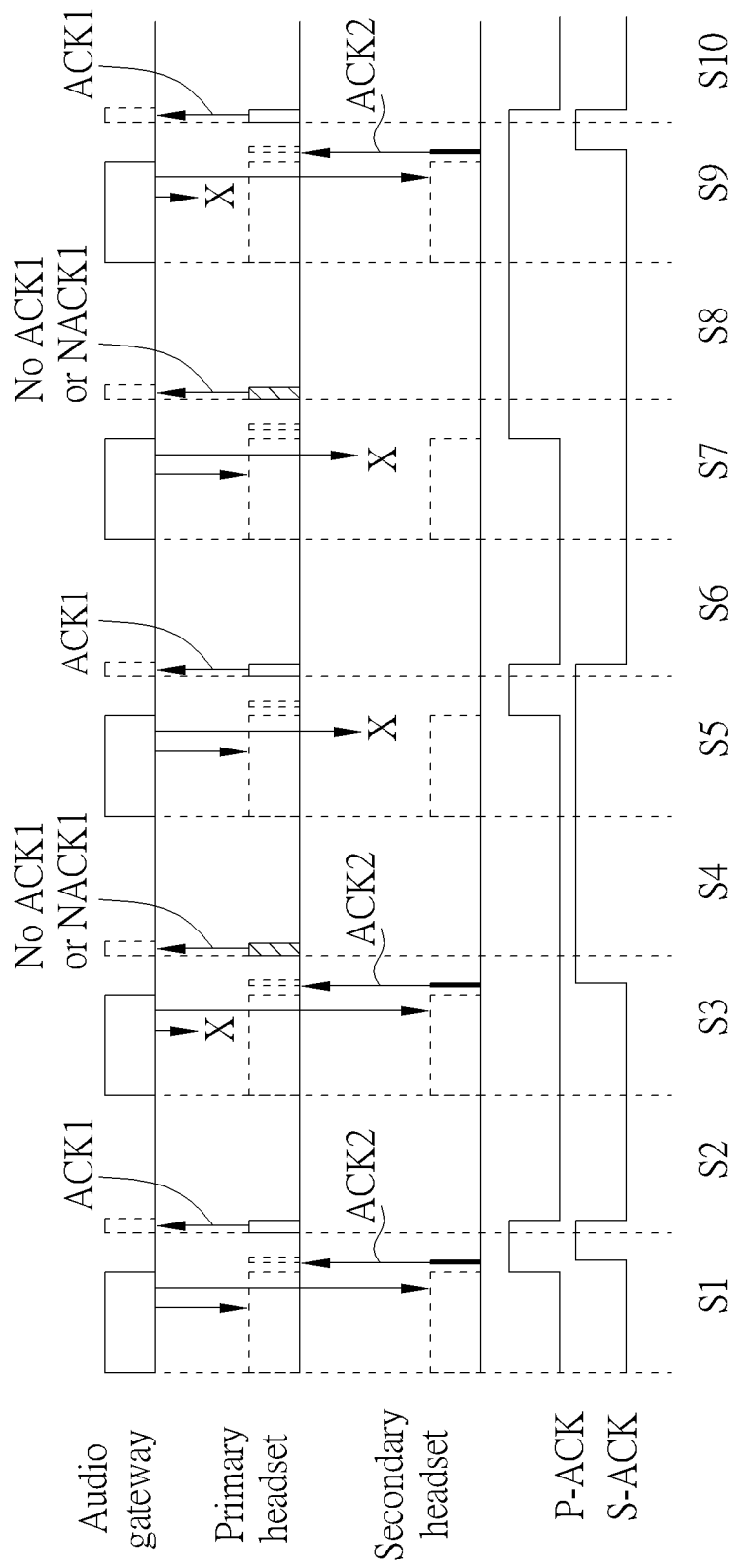
FIG. 3 is a diagram showing traffics of audio gateway, a primary device as a primary headset, and a secondary device as a secondary headset over aligned time slot boundary.

Refer to FIG. 3. FIG. 3 is a diagram showing traffics of audio gateway 105, primary device 110A as primary headset, and secondary device 110B as secondary headset over aligned time slot boundary. Piconets PN1 and PN2 have aligned Bluetooth time slot boundary. As shown in FIG. 3, for example, at time slot S1, the audio gateway 105 may wirelessly transmit an audio packet such as the N-th packet to the air, and both the primary device 110A and secondary device 110B successfully receive and decode such audio packet at time slot S1. The secondary device 110B at time slot S1 sends the acknowledge ACK2 to the primary device 110A. The primary device 110A asserts or sets the flag P-ACK as a high logical level (e.g. '1') when determining that the N-th audio packet has been successfully received and decoded by the primary device 110A, and then asserts or sets the flag S-ACK as '1' when determining that the acknowledgement ACK2 is successfully received by the primary device 110A.

At time slot S2, the primary device 110A sends the acknowledgement ACK1 to the audio gateway 105 and then de-asserts or resets both the flags P-ACK and S-ACK as a low logic level ('0'). Thus, based on the reception of the acknowledgement ACK1 transmitted from primary device 110A, the audio gateway 105 can determine that the N-th audio packet has been received by both the devices 110A and 110B and does not re-transmit the N-th audio packet.

At time slot S3, the audio gateway 105 may wirelessly transmit the (N+1)-th audio packet to the air, and the secondary device 110B successfully receives and decodes such audio packet at time slot S3 while the primary device 110A fails to receive and decode such audio packet at time slot S3. The secondary device 110B then at time slot S3 sends the acknowledge ACK2 to the primary device 110A. The primary device 110A then asserts or sets the flag S-ACK as '1' when determining that the acknowledgement ACK2 is successfully received by the primary device 110A; the flag P-ACK is still kept at '0'.

At time slot S4, the primary device 110A may send the negative acknowledgement NACK1 to the audio gateway 105 or may be arranged to not send the acknowledgement ACK1 to the audio gateway 105.

When receiving the negative acknowledgement NACK1 or detecting that no acknowledgements are received at time slot S4, the audio gateway 105 retransmits the (N+1)-th audio packet at time slot 5, and in this situation the primary device 110A successfully receives and decodes such retransmitted (N+1)-th audio packet at time slot S5 while the secondary device 110B fails to receive and decode such retransmitted (N+1)-th audio packet at time slot S5. The primary device 110A then asserts or sets the flag P-ACK as '1' when determining that the retransmitted (N+1)-th audio packet is successfully received by the primary device 110A; the flag S-ACK is kept at '1' at time slot S5.

When detecting that both the flags P-ACK and S-ACK are asserted or set as '1', the primary device 110A sends the acknowledgement ACK1 to the audio gateway 105 at a next time slot such time slot S6. Then, after sending ACK1, the primary device 110A de-asserts or resets both the flags P-ACK and S-ACK as '0' at time slot S6.

At time slot S7, the audio gateway 105 wirelessly transmits the (N+2)-th audio packet, and the primary device 110A successfully receives and decodes such audio packet at time slot S7 while the secondary device 110B fails to receive and decode such audio packet at time slot S7. The secondary device 110B does not send the acknowledgement ACK2 to the primary device 110A. Since no acknowledgements of secondary device 110B are received at time slot S7, the primary device 110A keeps the flag S-ACK at '0'. For flag P-ACK, the primary device 110A asserts or sets the flag P-ACK as '1' when determining that the (N+2)-th audio packet is successfully received and decoded by the primary device 110A.

At time slot S8, when detecting that at least one of the flags P-ACK and S-ACK is not asserted, the primary device 110A may send the negative acknowledgement NACK1 to the audio gateway 105 to indicate that it is needed to retransmit the audio packet or may be arranged to not send the acknowledgement ACK1 to the audio gateway 105. At time slot S8, the flag P-ACK and flag S-ACK are kept at '1' and '0', respectively.

At time slot S9, when receiving the negative acknowledgement NACK1 or detecting that no acknowledgements are received at time slot S8, the audio gateway 105 retransmits the (N+2)-th audio packet, and in this situation the secondary device 110B successfully receives and decodes such retransmitted (N+2)-th audio packet at time slot S9 while the primary device 110A may fail to receive and decode such retransmitted (N+2)-th audio packet at time slot S9. The secondary device 110B sends the acknowledgement ACK2 to the primary device 110A after receiving and decoding the retransmitted (N+2)-th audio packet. The primary device 110A then asserts or sets the flag S-ACK as '1' when determining that the acknowledgement ACK2 is received by the primary device 110A. The flag P-ACK is kept at '1' at time slot S9.

At time slot S10, when detecting that both the flags P-ACK and S-ACK are asserted or set as '1', the primary device 110A sends the acknowledgement ACK1 to the audio gateway 105 at a next time slot such time slot S10. Then, after sending ACK1, the primary device 110A de-asserts or resets both the flags P-ACK and S-ACK as '0'.

Thus, by doing so, the Bluetooth device (e.g. 110A) determined as a primary can be arranged to employ the flag S-ACK to record whether an audio packet (whether it is transmitted for the first time or is retransmitted) is successfully received and decoded by a secondary device and to employ the flag P-ACK to record whether the audio packet (whether it is transmitted for the first time is retransmitted) is successfully received and decoded by the primary device.

In other embodiments, the flag P-ACK and flag S-ACK may respectively include one or more bits to represent a counter of an integer range. For example, one bit can represent the $2^1$ integer range comprising zero and one, two bits can represent the $2^2$ integer range comprising zero, one, two, and three, and so on.

In one example, the flag P-ACK and flag S-ACK respectively include one bit, and the contents of bits of flag P-ACK and flag S-ACK are configured or set as a default value initially. The primary device 110A can send the acknowledgement ACK1 to the audio gateway 105 when detecting that either the flag P-ACK or flag S-ACK changes and becomes different from such default value. For example, the default value is configured as '0' (but not limited), and in one example the primary device 110A may be arranged to send the acknowledgement ACK1 to the audio gateway 105 when detecting that either the flag P-ACK or flag S-ACK is set as '1' which is different from the default value '0' That is, when the audio packet is successfully received by any one of the primary device 110A and secondary device 110B, either the flag P-ACK or flag S-ACK changes to '1', and the primary device 110A is arranged to send the acknowledgement ACK1 to the audio gateway 105. It should be noted that the default values of flags P-ACK and S-ACK may be configured as different; for example, one of the default values of flags P-ACK and S-ACK may be '0', and the other may be '1'. This also obeys the spirits of the invention. Further, in some embodiments, the primary device 110A may be arranged to reset the flag P-ACK and flag S-ACK as the default value (e.g. '0') each time when the primary device 110A sends the acknowledgement ACK1 to the audio gateway 105. Later, for the same or different packet transmission, once either the flag P-ACK or flag S-ACK changes and becomes different, the primary device 110A is used to send the acknowledgement ACK1 to the audio gateway 105.

Additionally, in another embodiment, the flags P-ACK and S-ACK respectively include counters having N bits wherein N for example is equal to two (but not limited). For example, the two bits of the first counter of flag P-ACK can be used to represent an integer range comprising zero, one, two, and three. The first counter of flag P-ACK is initially set as zero for each audio packet reception. When the primary device 110A successfully receives an audio packet each time, the primary device 110A increases the first counter by one. Similarly, the two bits of the second counter of flag S-ACK can be used to represent an integer range comprising zero, one, two, and three. The second counter of flag S-ACK is initially set as zero for each audio packet reception. When detecting that the secondary device 110B successfully sniffs an audio packet each time (e.g. the primary device 110A receives positive acknowledgment from the secondary device 110B), the primary device 110A increases the second counter of flag S-ACK by one. In this example, the primary device 110A is arranged to send the negative acknowledgement NACK1 to the audio gateway 105 to ask audio packet retransmission of a particular packet if detecting that some condition occurs. If no negative acknowledgements NACK1 are received by the audio gateway 105 before a specific timer expires, the audio gateway 105 will assume that a corresponding audio packet has been successfully received by both devices 110A and 110B. In practice, the primary device 110A is arranged to calculate the difference (i.e. absolute counter difference) between the first counter and second counter periodically or each time updating any one of the flags P-ACK and S-ACK, and then to compare the difference with a counter difference threshold such as two or three to determine whether to send the negative acknowledgement NACK1 to the audio gateway 105. The counter difference threshold can be set by a user. For example, the counter difference threshold may be two, and the primary device 110A sends the negative acknowledgement NACK1 to the audio gateway 105 and then resets the values of the first and second counters as zero when the difference between the counters of flags P-ACK and S-ACK is larger than or equal to two.

Further, the counter difference threshold may be configured or set automatically by the processor based on the application software program running on the audio gateway 105. For example, the application software program running on the audio gateway 105 is a real-time game application, and the primary device 110A can set the counter difference threshold as a lower integer such as two based on a request command from the real-time game application running on the audio gateway 105. Thus, once the number of times that one of both devices 110A and 110B fails to receive/sniff an audio packet becomes larger, the primary device 110A sends the negative acknowledgement NACK1 to the audio gateway 105 to ask packet retransmission. In addition, in other situations, the application software program running on the audio gateway 105 may be a generic music player application, and the primary device 110A can set the counter difference threshold as a higher integer such as three based on a request command from the generic music player application running on the audio gateway 105. It should be noted that a smaller counter difference threshold means that the primary device 110A sends the negative acknowledgement NACK1 to the audio gateway 105 more rapidly when the number of times that one of both devices 110A and 110B fails to receive/sniff an audio packet becomes larger.

It should be noted that the above-mentioned operation of sending the acknowledgement ACK1 to the audio gateway 105 when either the first flag or the second flag is changed and becomes different from the default value can be combined with the above-mentioned operation of sending the negative acknowledgement NACK1 to the audio gateway 105 when the difference between the first counter of flag P-ACK and second counter of flag S-ACK is larger than or equal to the counter difference threshold. This also obeys the spirits of the invention.

Figure 4:
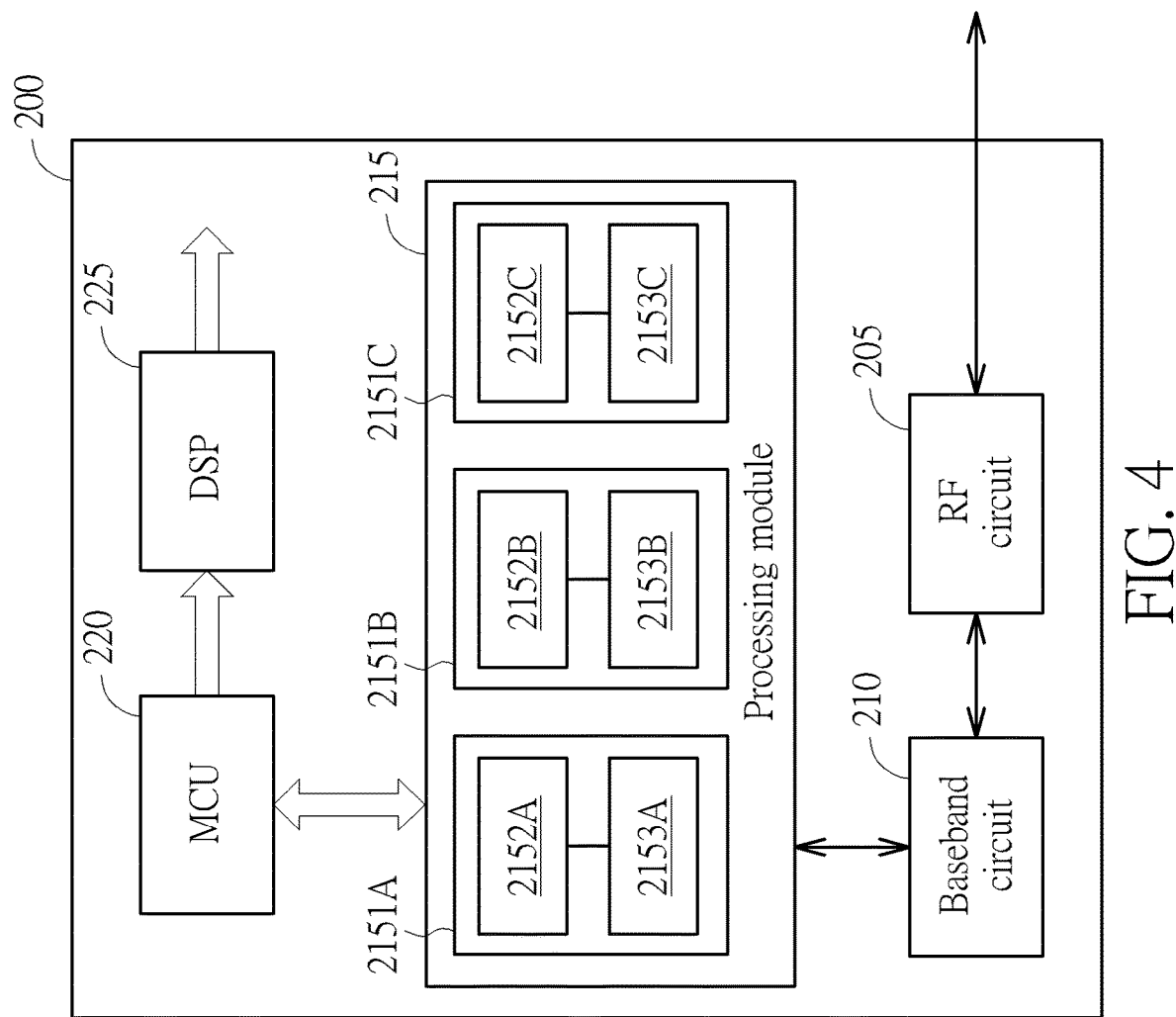
FIG. 4 is a block diagram of an implementation embodiment of a wireless Bluetooth device shown in FIG. 1.

FIG. 4 is a block diagram of an implementation embodiment of a wireless Bluetooth device 200 shown in FIG. 1. Each of the Bluetooth devices 110A and 110B can be implemented by using the wireless Bluetooth device 200. That is, the above-mentioned operations and functions of Bluetooth devices 110A and 110B are implemented by using the circuit elements comprised within the device 200. The wireless Bluetooth device 200 for example is with a multi-point connection function and comprises a plurality of controllers such as three controllers (but not limited) wherein one controller is used for supporting management/ control traffic exchange and two controls are used for supporting different audio channels. The multipoint connection function means that the Bluetooth device 200 is capable of supporting multiple Bluetooth audio communication channels. For example, in a Bluetooth audio communication channel, the Bluetooth device 200 may be a primary device, and in another Bluetooth audio communication channel the Bluetooth device 200 may be a secondary device. However, this is not intended to be a limitation. The Bluetooth device 200 may be a primary for multiple Bluetooth audio communication channels or may be a secondary for multiple Bluetooth audio communication channels.

In practice, as shown in FIG. 4, the Bluetooth device 200 comprises an RF circuit 205, a baseband circuit 210, a processing module 215, a microcontroller unit (MCU) 220, and a digital signal processor (DSP) 225. The processing module 215 for example is a Bluetooth modem controlling module which comprises three piconet controllers 2151A-2151C which respectively comprise memories 2152A-2152C and processors 2153A-2153C. The RF circuit 205 is an RF transceiver used for receiving a radio signal corresponding to audio packets from an antenna (not illustrated) of Bluetooth device 200 to generate a digital signal. The baseband circuit 210 is coupled to the RF circuit 205 and used for receiving and processing the digital signal in digital domain and then providing the processed digital signal for the processing module 215 wherein the processed digital signal comprises audio data samples and control data.

The controller 2151A comprises the memory 2152A and processor 2153A wherein the processor 2153A is arranged for perform peer-to-peer control between two Bluetooth devices to exchange/share information such as Bluetooth clock, channel information of a piconet, Bluetooth address, and so on. In addition, for determining whether the Bluetooth device 200 is a primary device or a secondary device, in one embodiment, the controller 2151A is arranged to alternatively page to find another controller of another Bluetooth device or listen whether it is paged by such another controller. If the controller 2151A is found by such another controller, then the Bluetooth device 200 is determined as the secondary device, otherwise, the Bluetooth device 200 is determined as the primary device.

The other two controllers 2151B and 2151C respectively support different audio channels. For example, the controller 2151B can be used as a primary device for receiving Bluetooth packets from an audio gateway in the Bluetooth mode and for receiving an acknowledgement of a secondary device in the TWS (wireless stereo) mode in a piconet, for the same audio channel such as channel A. The controller 2151C can be used as a primary device for receiving Bluetooth packets from another different audio gateway in the Bluetooth mode and for receiving an acknowledgement of another secondary device in the TWS mode in another different piconet, for the same audio channel such as channel B. The memory 2152B is configured to include and record a set of flags P-ACK and S-ACK, and the memory 2152C is configured to include and record a different set of flags P-ACK and S-ACK. The processors 2153B and 2153C are arranged to respectively perform corresponding operations (assertion/de-assertion of flags and transmission of acknowledgement) associated with the first set of flags P-ACK and S-ACK and the second set of flags P-ACK and S-ACK; the descriptions are not detailed for brevity.

MCU 220 is arranged to retrieve audio data and provide the audio data to the DSP 225. The DSP 225 is arranged to generate audio codecs based on the audio data and output the audio codecs for audio playing. In the same piconet, the DSP (e.g. 225) of primary headset 110A and the DSP of secondary headset 110B are arranged to keep the same Bluetooth clock. In practice, the DSP clock of secondary headset 110B is aligned with that of primary headset 110A. In addition, both the primary headset 110A and secondary headset 110B respectively include buffers for temporarily storing multiple audio packets. In the example of FIG. 4, the DSP 225 may include two buffers respectively supporting the piconet controllers 2151B and 2151C for different piconets. In addition, for example, a buffer may be configured to buffer the amount audio packets corresponding to audio samples with 200 ms, and one audio packet may correspond to audio samples with 5 ms (but not limited). When playing audio samples of a sequence of audio packets, the DSP 225 of primary headset 110A and another DSP of secondary headset 110B are capable of outputting audio codecs corresponding to audio samples of the same packet at the same time based on the aligned clocks for sync audio playing.

Figure 5:
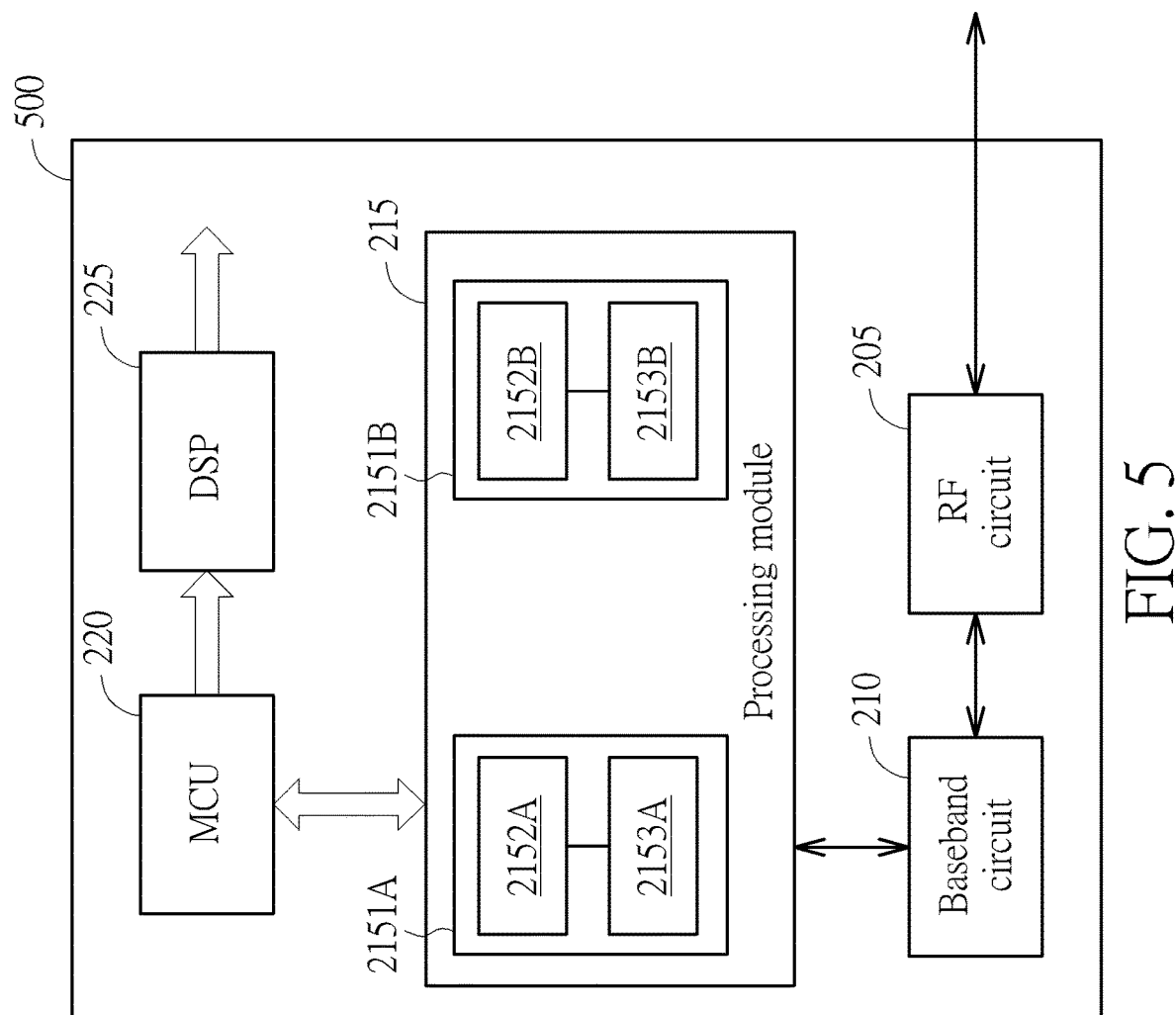
FIG. 5 is a block diagram of another implementation embodiment of a wireless Bluetooth device shown in FIG. 1.

Additionally, it should be noted that in other embodiments a wireless stereo Bluetooth device may be with a single point connection function and comprise a controller used as a primary device or a secondary device. FIG. 5 shows a block diagram of another implementation 500 of the wireless Bluetooth device 200 shown in FIG. 4. The operations and functions of circuit units in FIG. 5 are not detailed for brevity.

Further, in other implementations, a controller of a wireless Bluetooth device may comprise a single flag which is stored by the above-mentioned memory and asserted by the above-mentioned processor when the processor successfully receives an acknowledgement from a secondary device wherein a reception of the acknowledgement indicates that the secondary device successfully receives a particular audio packet. The processor is arranged for transmitting an acknowledgement of such particular audio packet to the audio gateway when such particular audio packet is received and the flag is asserted. That is, to achieve the functions described in the previous paragraphs, the number of flags is not meant to be a limitation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller of a Bluetooth device, comprising:
   a memory, configured for storing a first flag and a second flag; and
   a processor, coupled to the memory, configured for transmitting an acknowledgement of a particular packet to an audio gateway when detecting that either the first flag or the second flag changes and becomes different from a default value;
   wherein the first flag is changed by the processor and becomes different from the default value when the processor successfully receives the particular packet transmitted from the audio gateway, and the second flag is changed by the processor and becomes different from the default value when the processor successfully receives an acknowledgement from a secondary device wherein a reception of the acknowledgement indicates that the secondary device successfully receives the particular packet; the processor increases a first counter of the first flag by one each time when successfully receives the particular packet transmitted from the audio gateway; the processor increases a second counter of the second flag by one each time when the processor successfully receives the acknowledgement from the secondary device; and, the processor is arranged to send a negative acknowledgement of the particular packet to the audio gateway when a difference between the first counter and the second counter is larger than or equal to a counter difference threshold.

2. The controller of claim 1, wherein the processor is arranged to reset the first counter and the second counter after sending the negative acknowledgement of the particular packet.

3. The controller of claim 1, wherein the processor adjusts the counter difference threshold based on a type of an application software program running on the audio gateway.

4. The controller of claim 1, wherein the processor resets the first flag and the second flag as the default value each time when the processor sends the acknowledgement of the particular packet to the audio gateway.

5. A method applied into a controller of a Bluetooth device, comprising:
   providing a first flag and a second flag which are configured as a default value respectively, wherein the first flag includes a first counter and the second flag includes a second counter;
   changing the first flag from the default value when the controller successfully receives the particular packet transmitted from the audio gateway;
   changing the second flag from the default value when the controller successfully receives an acknowledgement from a secondary device wherein a reception of the acknowledgement indicates that the secondary device successfully receives the particular packet;
   transmitting an acknowledgement of a particular packet to an audio gateway when detecting that either the first flag or the second flag changes and becomes different from the default value;
   increasing the first counter of the first flag by one each time when successfully receives the particular packet transmitted from the audio gateway;
   increasing the second counter of the second flag by one each time when the processor successfully receives the acknowledgement from the secondary device; and
   sending a negative acknowledgement of the particular packet to the audio gateway when a difference between the first counter and the second counter is larger than or equal to a counter difference threshold.

6. The method of claim 5, further comprising:
   resetting the first counter and the second counter after sending the negative acknowledgement of the particular packet.

7. The method of claim 5, further comprising:
   adjusting the counter difference threshold based on a type of an application software program running on the audio gateway.

8. The method of claim 5, further comprising:
   resetting the first flag and the second flag as the default value each time when the acknowledgement of the particular packet is sent to the audio gateway.

9. A controller of a Bluetooth device, comprising:
   a memory, configured for storing a first flag and a second flag, the first flag being changed by a processor and becomes different from a default value when the processor successfully receives a particular packet transmitted from an audio gateway, and the second flag being changed by the processor and becomes different from the default value when the processor successfully receives an acknowledgement from a secondary device wherein a reception of the acknowledgement indicates that the secondary device successfully receives the particular packet; and
   a processor, coupled to the memory, configured for:
   increasing a first counter of the first flag by one each time when successfully receives the particular packet transmitted from the audio gateway;
   increasing a second counter of the second flag by one each time when the processor successfully receives the acknowledgement from the secondary device; and
   sending a negative acknowledgement of the particular packet to the audio gateway when a difference between the first counter and the second counter is larger than or equal to a counter difference threshold.

10. The controller of claim 9, wherein the processor is arranged to reset the first counter and the second counter after sending the negative acknowledgement of the particular packet.

11. The controller of claim 9, wherein the processor adjusts the counter difference threshold based on a type of an application software program running on the audio gateway.

12. A method applied into a controller of a Bluetooth device, comprising:
   providing a first flag and a second flag which are configured as a default value respectively;
   changing the first flag from the default value when the controller successfully receives the particular packet transmitted from the audio gateway; and
   changing the second flag from the default value when the controller successfully receives an acknowledgement from a secondary device wherein a reception of the acknowledgement indicates that the secondary device successfully receives the particular packet;
   wherein the step of changing the first flag comprises:
      increasing a first counter of the first flag by one each time when successfully receives the particular packet transmitted from the audio gateway; and
   the step of changing the second flag comprises:
      increasing a second counter of the second flag by one each time when the processor successfully receives the acknowledgement from the secondary device; and
   the method further comprises:
      sending a negative acknowledgement of the particular packet to the audio gateway when a difference between the first counter and the second counter is larger than or equal to a counter difference threshold.

13. The method of claim 12, further comprising:
   resetting the first counter and the second counter after sending the negative acknowledgement of the particular packet.

14. The method of claim 12, further comprising:
   adjusting the counter difference threshold based on a type of an application software program running on the audio gateway.

* * * * *